United States Patent
Borko

(10) Patent No.: US 9,505,493 B2
(45) Date of Patent: *Nov. 29, 2016

(54) SYSTEM FOR AUTOMATIC TAKEOFF AND LANDING BY INTERCEPTION OF SMALL UAVS

(71) Applicant: Brandon Borko, Fredericksburg, VA (US)

(72) Inventor: Brandon Borko, Fredericksburg, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/222,158

(22) Filed: Mar. 21, 2014

(65) Prior Publication Data

US 2015/0266575 A1    Sep. 24, 2015

(51) Int. Cl.
| | |
|---|---|
| B64F 1/06 | (2006.01) |
| B64C 39/02 | (2006.01) |
| B64F 1/02 | (2006.01) |
| B64F 1/12 | (2006.01) |
| G05D 1/10 | (2006.01) |
| B64F 1/22 | (2006.01) |

(52) U.S. Cl.
CPC ............ *B64C 39/024* (2013.01); *B64F 1/02* (2013.01); *B64F 1/12* (2013.01); *B64F 1/222* (2013.01); *G05D 1/101* (2013.01); *B64C 2201/024* (2013.01); *B64C 2201/088* (2013.01); *B64C 2201/141* (2013.01); *B64C 2201/146* (2013.01); *B64C 2201/182* (2013.01); *B64C 2201/20* (2013.01); *B64C 2201/205* (2013.01); *B64F 1/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,472,866 B2* | 1/2009 | Heaston | .................. | B63G 8/28 244/63 |
| 7,510,145 B2* | 3/2009 | Snediker | .................. | B64F 1/02 244/110 F |
| 2006/0167599 A1* | 7/2006 | Bodin | .................. | G08G 5/0069 701/16 |
| 2006/0249622 A1* | 11/2006 | Steele | .................. | B64F 1/04 244/115 |
| 2009/0294584 A1* | 12/2009 | Lovell | .................. | B63B 27/10 244/110 F |
| 2009/0306840 A1* | 12/2009 | Blenkhorn | .................. | G05D 1/0676 701/16 |
| 2009/0314883 A1* | 12/2009 | Arlton | .................. | B64C 39/024 244/63 |
| 2010/0168949 A1* | 7/2010 | Malecki | .................. | G05D 1/0676 701/24 |
| 2012/0187243 A1* | 7/2012 | Goldie | .................. | B64C 39/024 244/110 C |
| 2013/0341462 A1* | 12/2013 | Jacobs | .................. | B64F 1/02 244/110 R |

* cited by examiner

*Primary Examiner* — Thomas Tarcza
*Assistant Examiner* — Edward J Pipala
(74) *Attorney, Agent, or Firm* — Stanzione & Associates, PLLC

(57) ABSTRACT

A system for facilitating automated landing and takeoff of an autonomous or pilot controlled hovering air vehicle with a cooperative underbody at a stationary or mobile landing place and an automated storage system used in conjunction with the landing and takeoff mechanism that stores and services a plurality of UAVs is described. The system is primarily characterized in that the landing mechanism is settable with 6 axes in roll, pitch, yaw, and x, y and z and becomes aligned with and intercepts the air vehicle in flight and decelerates the vehicle with respect to vehicle's inertial limits. The air vehicle and capture mechanism are provided with a transmitter and receiver to coordinate vehicle priority and distance and angles between landing mechanism and air vehicle. The landing and takeoff system has means of tracking the position and orientation of the UAV in real time. The landing mechanism will be substantially aligned to the base of the air vehicle. With small UAVs, their lifting capacity is limited. Reducing sensing and computation requirements by having the landing plate perform the precision adjustments for the landing operation allows for increased flight time and/or payload capacity.

29 Claims, 24 Drawing Sheets

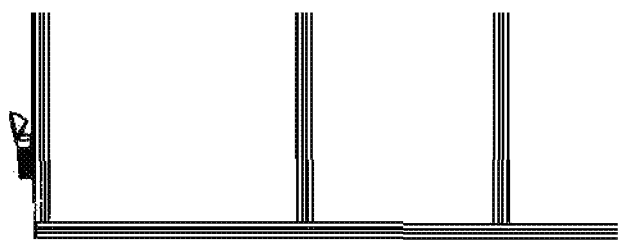
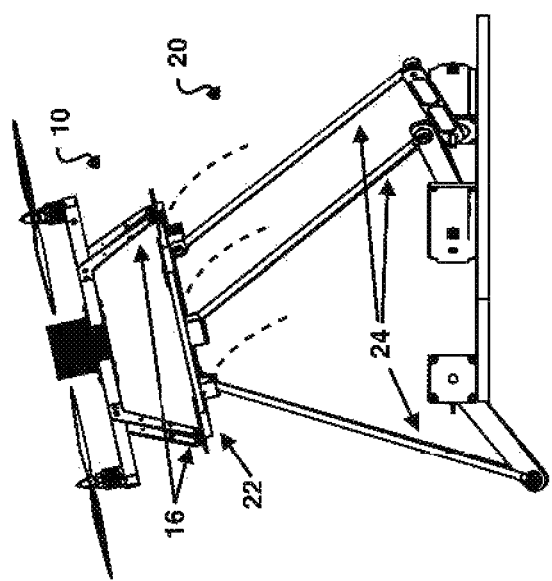
Fig. 2

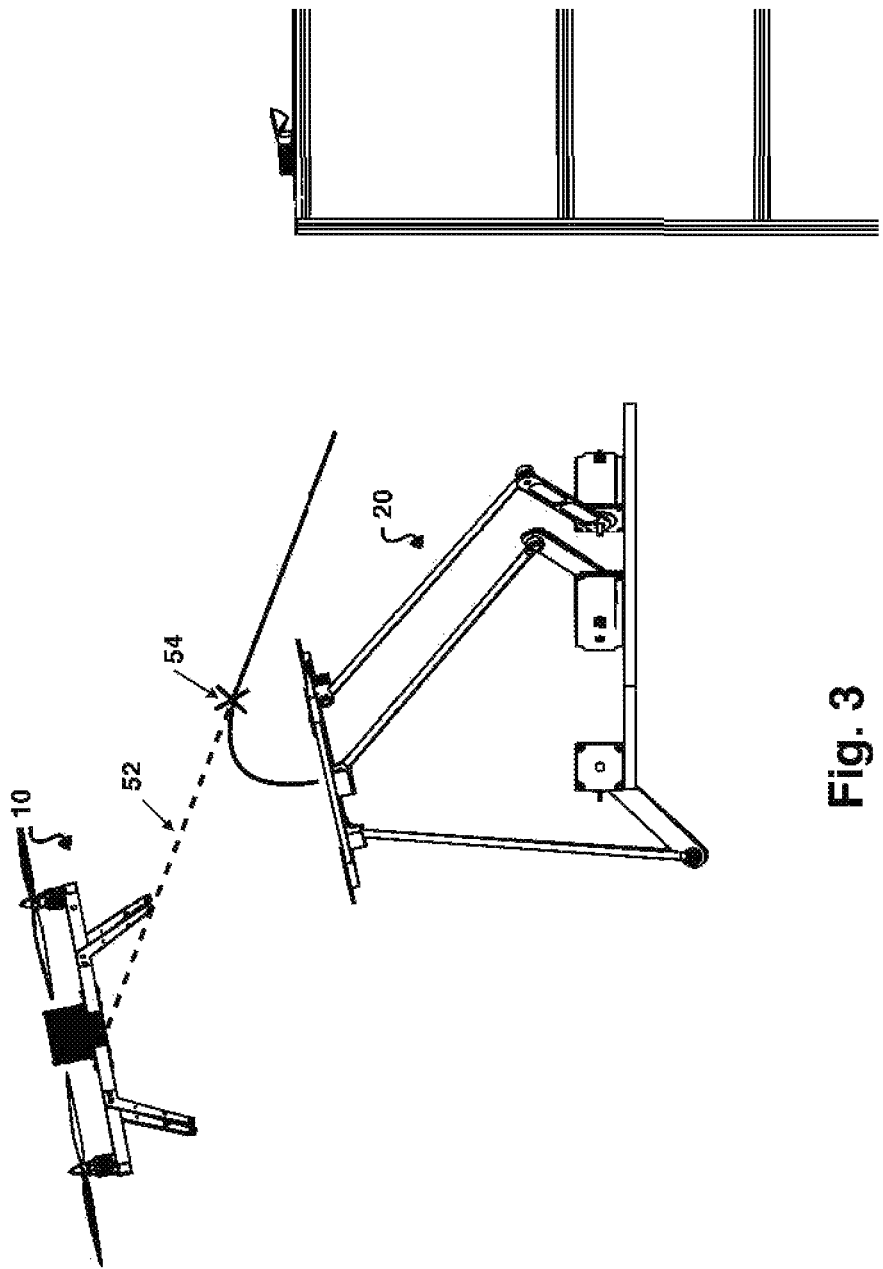

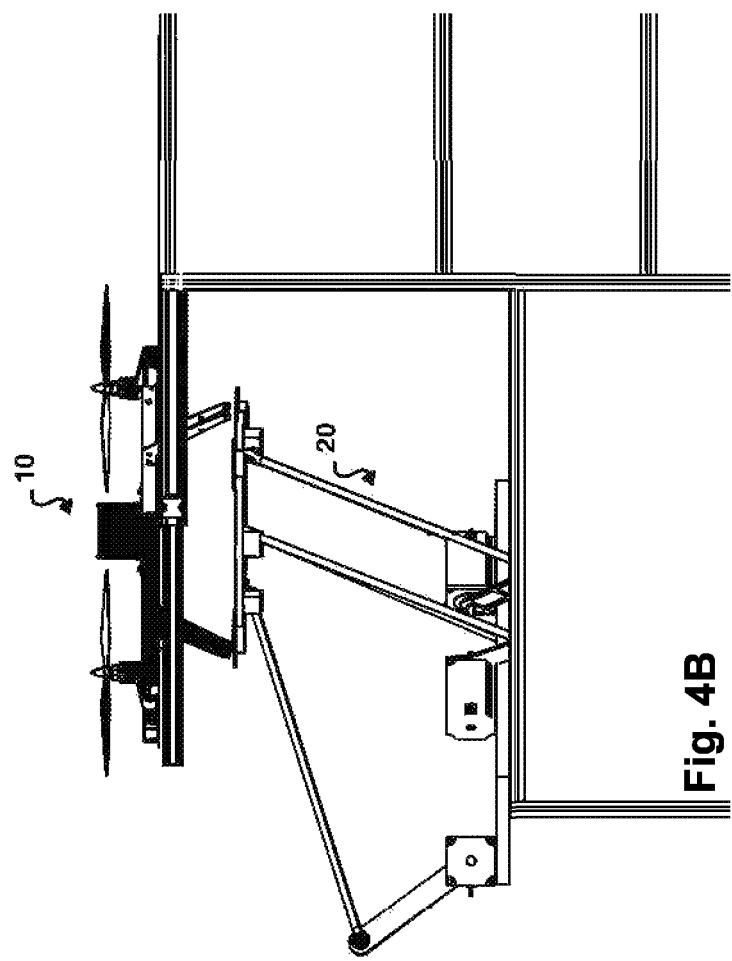

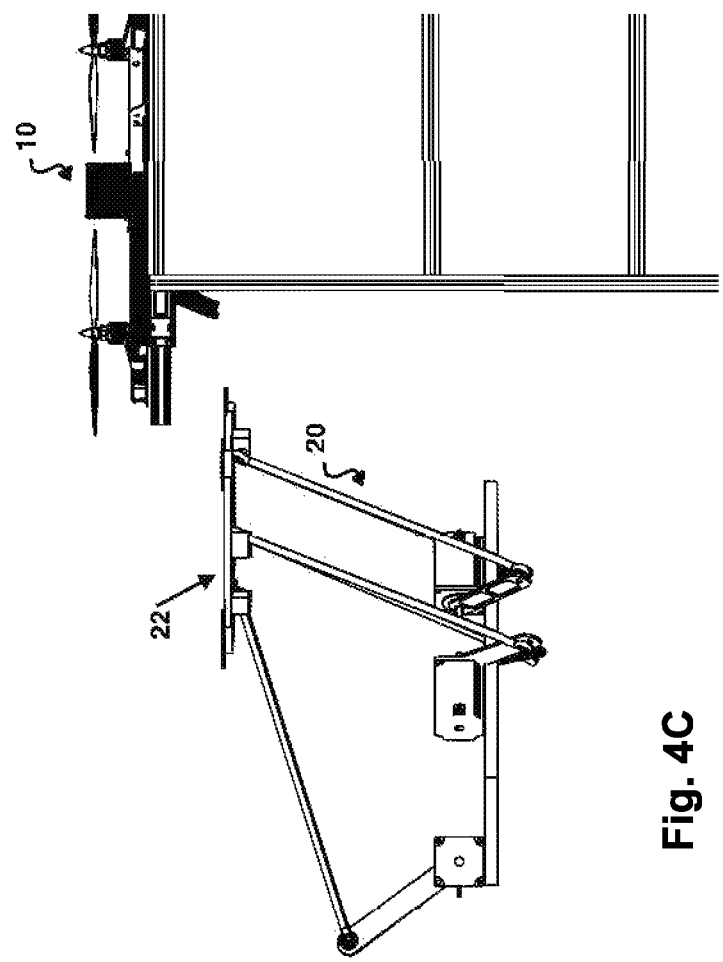

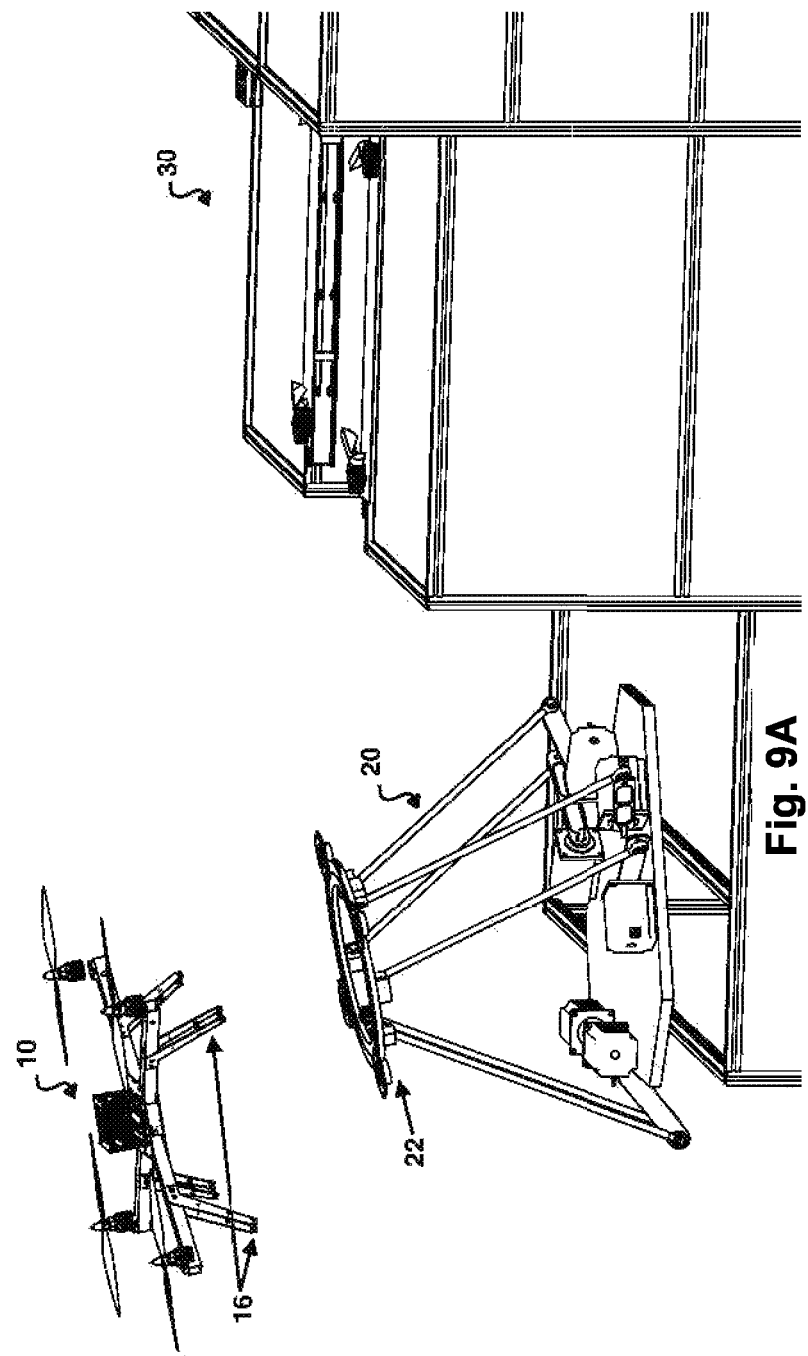

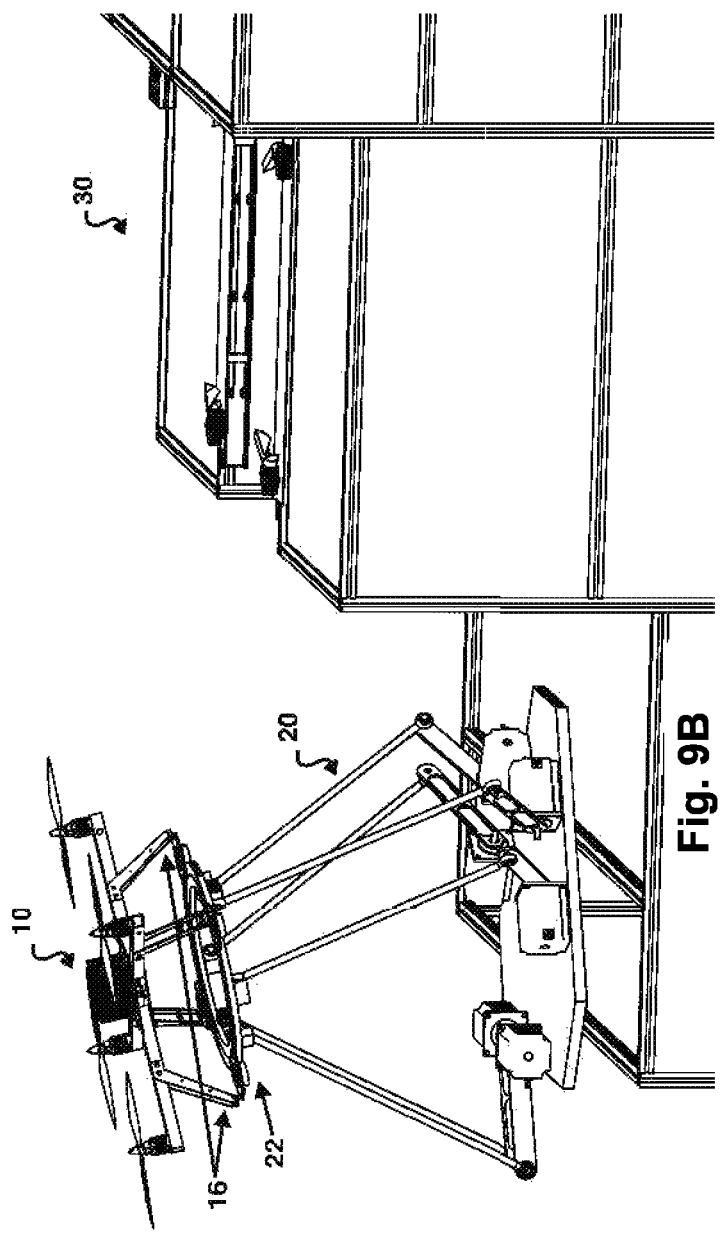

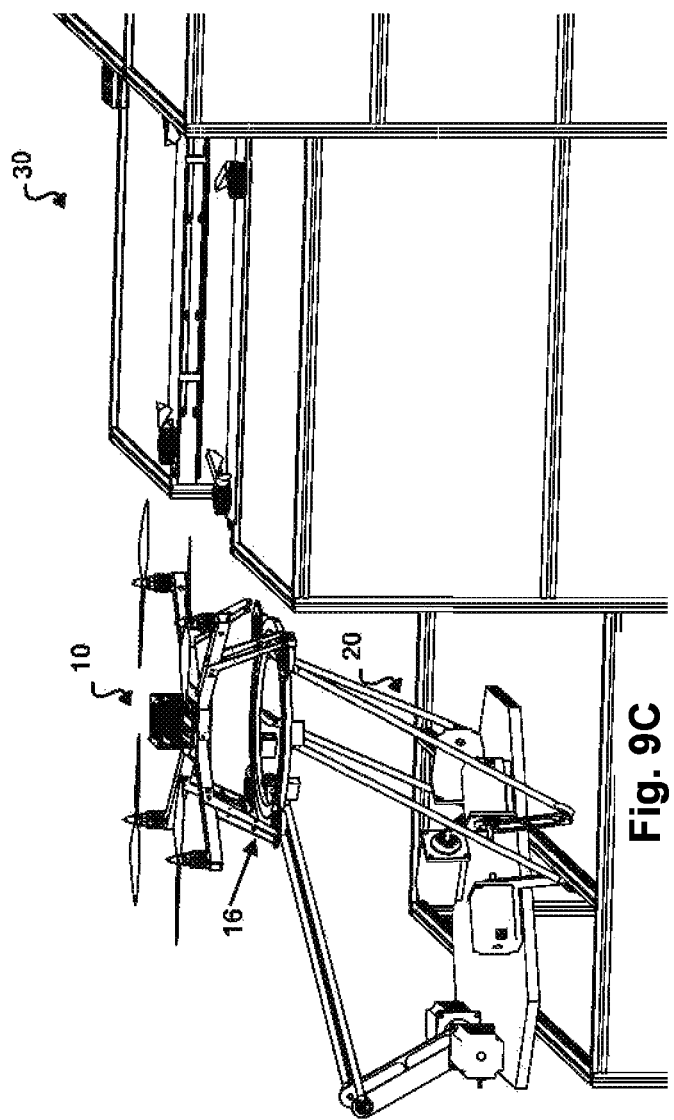

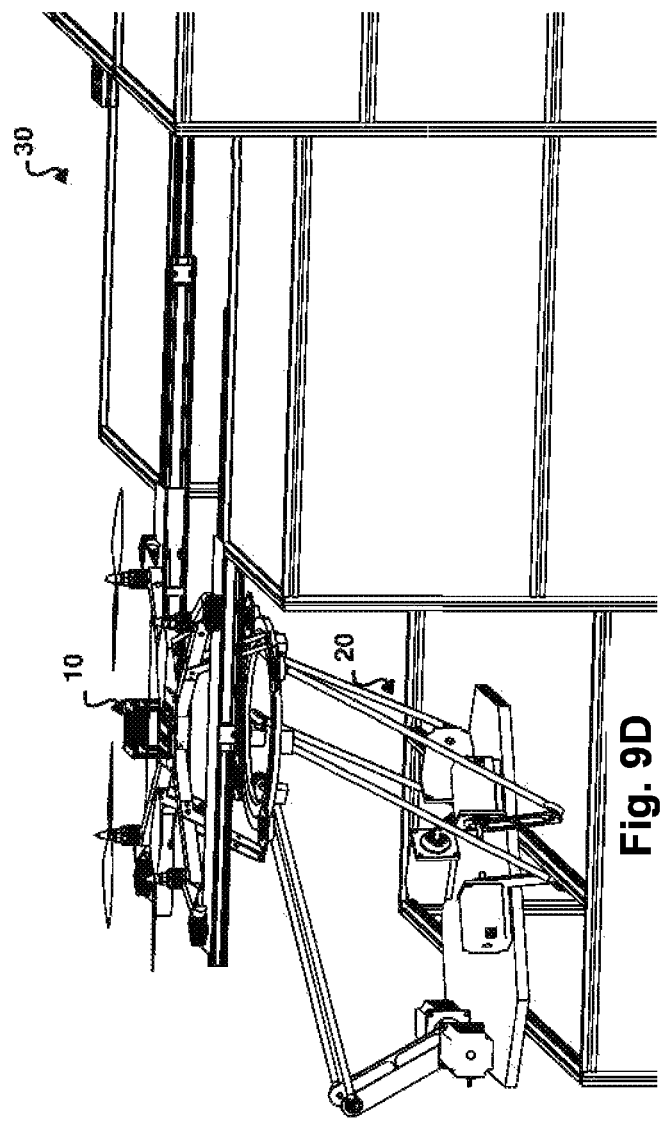

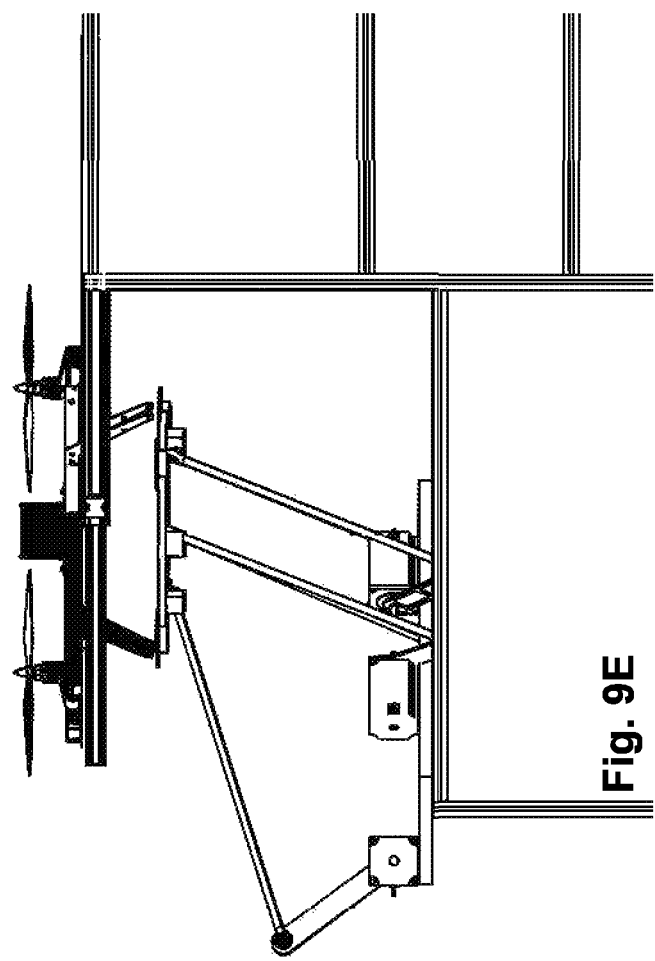

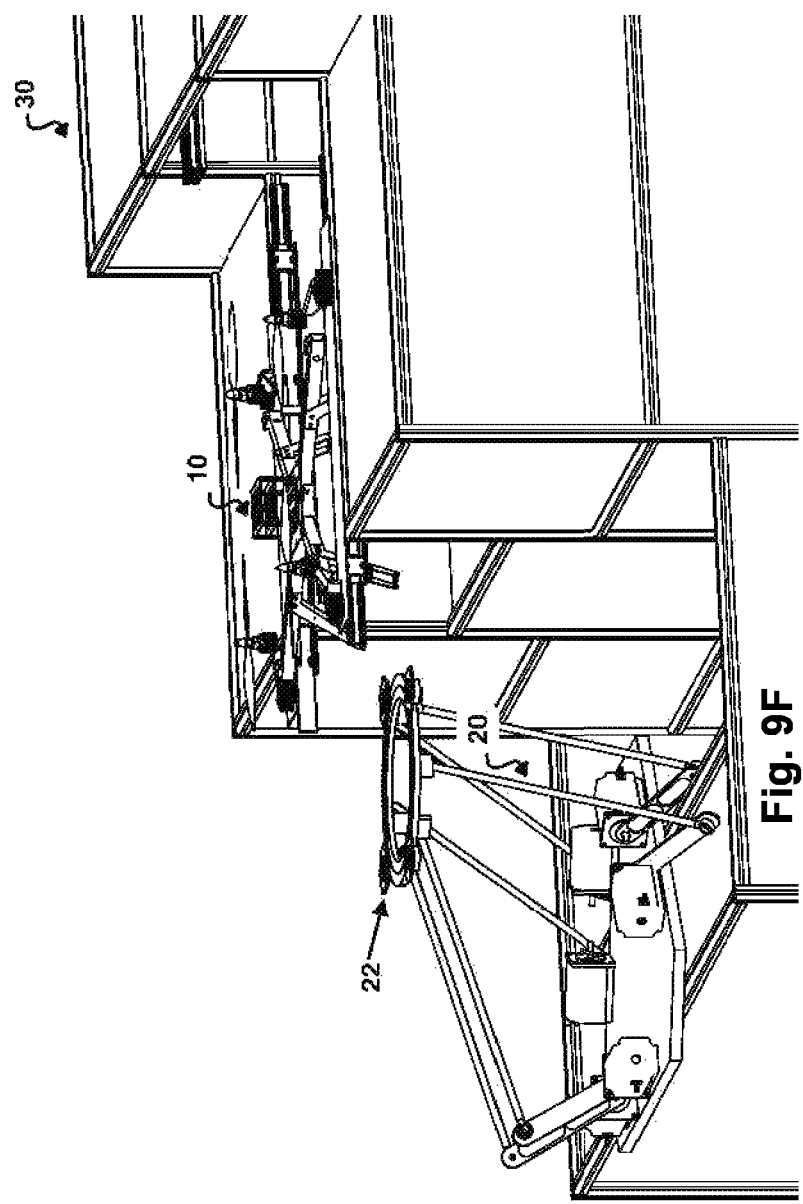

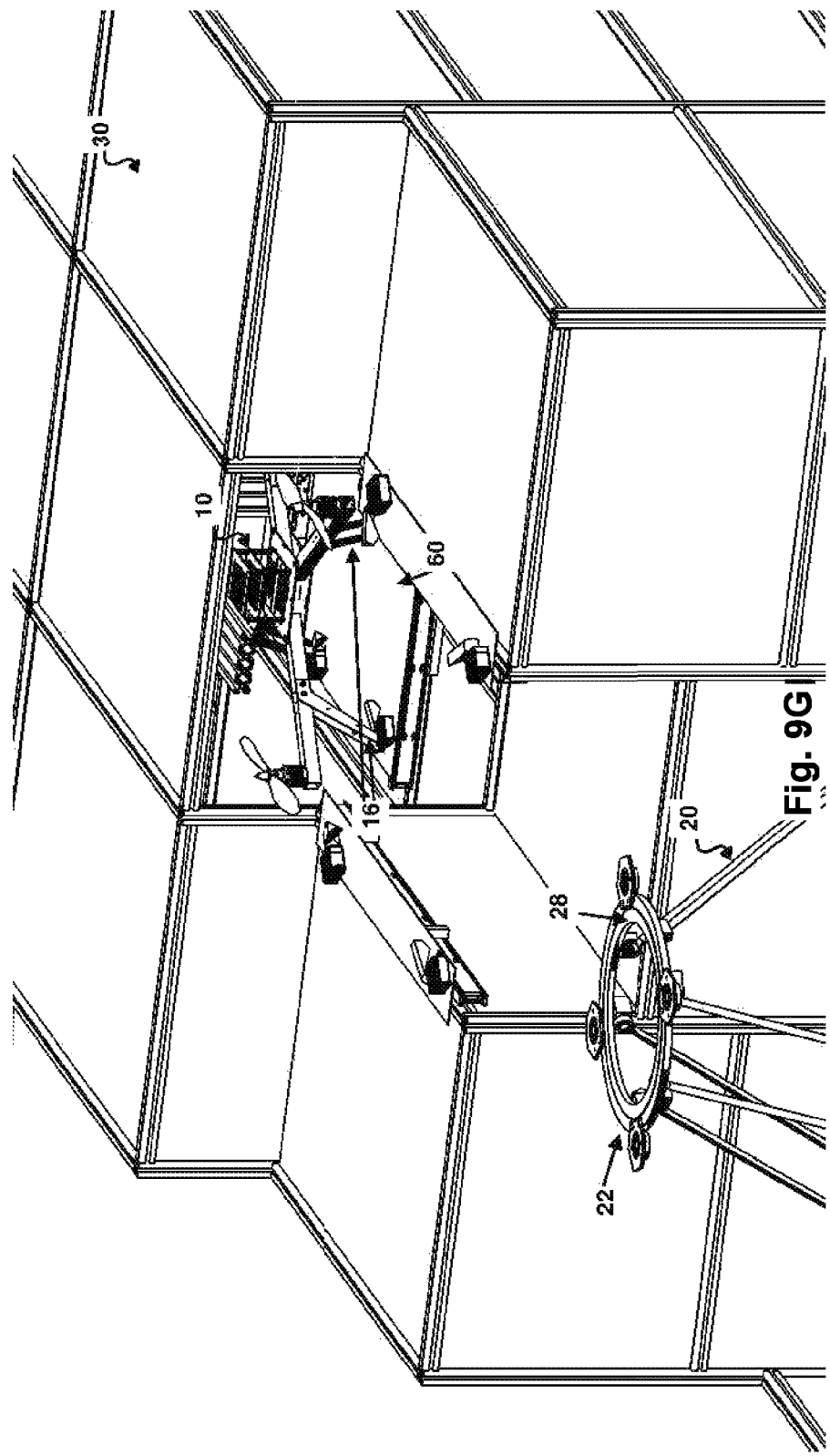

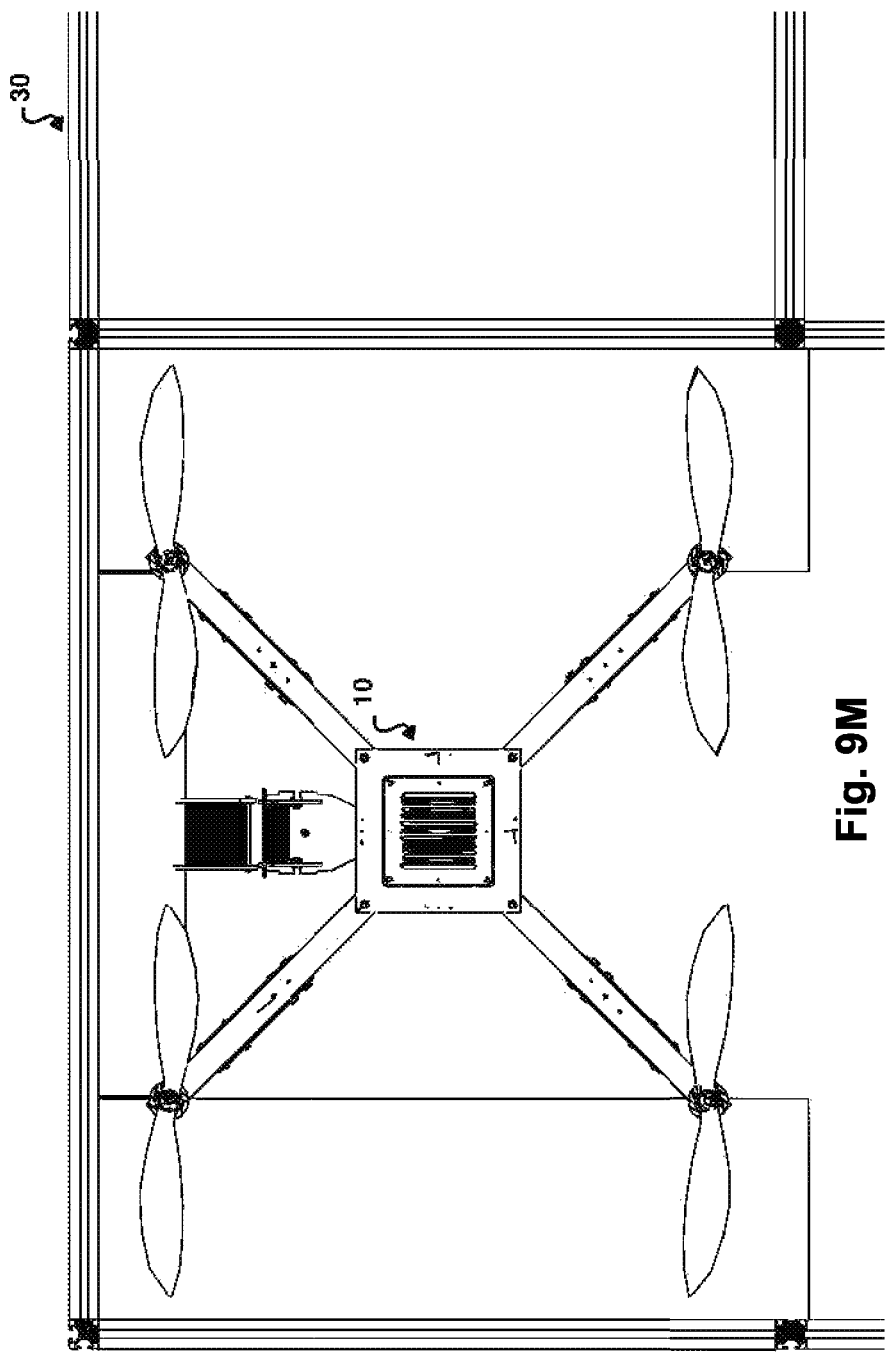

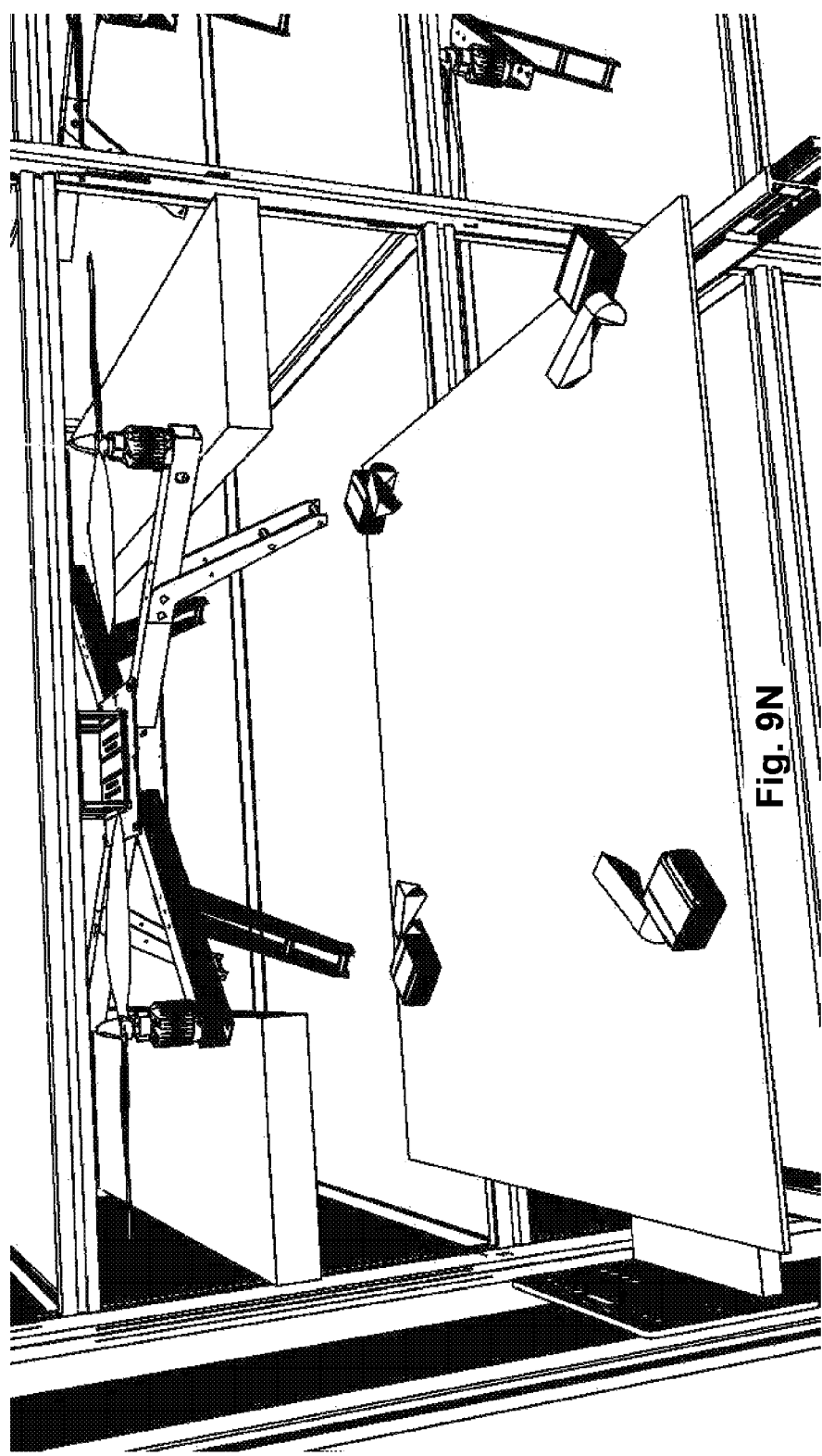

SYSTEM FOR AUTOMATIC TAKEOFF AND LANDING BY INTERCEPTION OF SMALL UAVS

BACKGROUND

Small unmanned air vehicles (UAVs), also known as unmanned aerial systems (UASs) or drones, have been used in photography, surveillance, sensing and mapping applications, payload delivery, and many other uses. The use of small UAVs provides capability for tasks that require cameras or payloads to be present in difficult to access or dangerous locations.

Small UAVs are often electric vehicles with flight time that is limited by battery capacity. When the battery is near being depleted, the operator or mission control software must end the task, fly the vehicle to a service location, land, swap or recharge the battery, fly back to location, and then resume the task. This operational cycle is tedious and time-consuming for a human to be involved. Automated launching, landing, and servicing can mitigate these problems.

Moreover, small UAVs, whether fully autonomous or piloted remotely with a human or computer operator, are deployed by the human operator and managed by human operators while not in use. This required human deployment and management is cumbersome, especially when dealing with multiple vehicles simultaneously, and may be prohibitive when dealing with a large number of vehicles. In addition, the deployment and retrieval of small UAVs, including startup placement, battery and fuel management, and mission initiation requires an informed operator to be present. A storage system according to the principles of the instant disclosure can be used to manage and service a, plurality of UAVs to solve these problems.

Existing methods for automated landing of UAVs exist with various disadvantages. Certain landing methods known in the art, such as net-type or vertical wire systems, require a human to disengage the UAV, require a separate launching mechanism, and/or have a high probability of damage. In the case of a passive landing system, existing autonomous UAV landing requires intelligence to be present on the UAV itself to align with a static landing pad and attempt to maintain alignment throughout the landing process. However, due to size, UAVs have limited processing power and sensing capability onboard, making such a landing procedure disadvantageous. In addition, conditions such as high or turbulent winds, a dynamic moving vehicle, and the like, may cause a failure to maintain alignment and failure to land precisely.

Currently, limited sensing capability on small UAVs requires operators to manually land and launch small UAVs, because of uncertainty to the autonomous vehicle about landing conditions. Ground slope, tail grass, water, and windy conditions create hazards and uncertainty that could cause UAV damage. Software algorithms exist to land UAVs automatically by slowly reducing altitude in small increments until a hard stop is detected, if the operator selects a suitable landing zone beforehand. This is not ideal because flight time is limited, the operator must think about and select a landing location, and the UAV still has to be handled by an operator after it has landed. If the operator wants to hold a position or fly an autonomous mission, the UAV is typically manually launched and then switched into the computer-controlled mode.

SUMMARY OF THE DISCLOSURE

The subject of the present disclosure seeks to address the shortcomings of existing UAV systems. Systems and methods are described herein for safely landing a small UAV, especially in turbulent winds, high wind conditions, or on an irregularly moving surface such as the back of a moving truck or deck of a ship in rough waters. According to aspects of the disclosure, such a system may include a launch and capture mechanism (LCM) that may serve as a landing/launching dock for UAVs. The position of the LCM may be settable with respect to six axes in roll, pitch, yaw, height, and two orthogonal axes parallel to the ground, by a controlled relationship to the air vehicle. The LCM may remain substantially parallel to the undercarriage of the UAV. Moreover, the systems and methods include a storage system for automatically storing and/or retrieving UAVs before or after a mission.

The LCM may facilitate automatic capture and launch of small UAVs. This is achieved when a robotic mechanism matches the UAV's trajectory and decelerates the (JAY after the LCM intercepts and locks to the UAV. The LCM may have six degrees-of-freedom to match the UAV's position as it approaches. The LCM may include transducers such as, e.g., optical sensors, radio frequency (RF) sensors, infra-red (IR) sensors, global positioning satellite (GPS) sensors, charge coupled devices (CCDs), cameras, inductive sensors and the like, that allow the LCM to get an accurate relative position of the UAV as it approaches. An inertial measurement unit (IMU) may be mounted to the base of the LCM that measures movements of the platform it is mounted to (e.g. ground vehicle goes over a bump or ship in rough sea conditions). The LCM can also communicate via radio link with the UAV to improve its trajectory estimates.

The landing/launching dock may include an active docking system for positive control of a docked UAV. The active docking system may include a locking system. The active docking system may include an automated capture system for UAVs, allowing for a fully automated operations cycle, including launching of UAVs, capturing UAVs, landing UAVs, and servicing UAVs, without manual operator intervention.

According to aspects of the disclosure, the system may comprise flight controller software for the UAV, so that the UAV may successfully approach and LCM and be disabled after capture. The system may include a launch sequence so that the LCM can enable flight simultaneously with release of the UAV.

According an aspect of the disclosure, the system may be mounted to a carrier vehicle such as a ground vehicle (e.g. truck) or a water vehicle (e.g. ship) or another type of vehicle. The UAV may be landed on a docking station, a landing plate, the ground, or the like. The UAV flies according to a path to be intercepted by the LCM using technology such as, e.g., GPS, IMU, LADAR, RADAR, or the like, to fly accurately. The UAV may include one or more mating components (such as, e.g., a ferrous metal) to mate with a cooperative locking mechanism (e.g., an electromagnet) on the docking station. The mating component(s) and cooperative locking mechanism may be mechanical in nature or some other positive locking mechanism.

The system may include a plurality (e.g., six) of electric motors connected to an arm with two links and further all joined to an end effector of a landing plate. For instance, the system may include a robotic structure such as, e.g., as a parallel robot, a hexa robot, or the like. An additional (e.g., seventh) electric motor may provide yaw control (rotation) of the landing plate so that the, e.g., electromagnets can align with, e.g., the ferrous material on the UAV. After a successful landing procedure has taken place, the UAV may be removed by an external robotic mechanism mounted to, e.g., robotic rails that extend over the LCM and lock to the UAV. The external robotic mechanism may be part of a storage system that stores the UAV that is removed from the LCM.

The system may include an electric motor connected to, e.g., a revolute joint, a spherical joint, and another spherical joint. A plurality (e.g., six) of these motor arm combinations may come together and be mounted to the landing plate, which may have a plurality (e.g., four) cooperative locking mechanisms to lock down the UAV. Upon locking to the UAV, the LCM may maintain control and follow a computed path to safely decelerate the UAV.

The storage system may include a plurality of storage receptacles for storing a plurality of UAVs. The storage system may include data and battery links for connecting to the UAVs when in storage. The storage system may also include means for manipulating components on the UAV. For example, the storage system may be configured to replace the battery with a new battery, change a payload sensor to a new sensor, configure an existing sensor, add or remove a camera, load a payload (e.g., mail, supplies, etc.), and/or other tasks relevant to the LAY components.

BRIEF DESCRIPTION OF THE DRAWINGS

FIG. 2 is an illustration of a mated UAV at the end of a capture sequence.

FIG. 3 is a view of the UAV ready to be docked, illustrating the launch gear as a part of the positive locking mechanism.

FIGS. 4A-4C are illustrations of automated removal of the UAV from the launch and capture system to a storage system.

DETAILED DESCRIPTION

Figure 1:
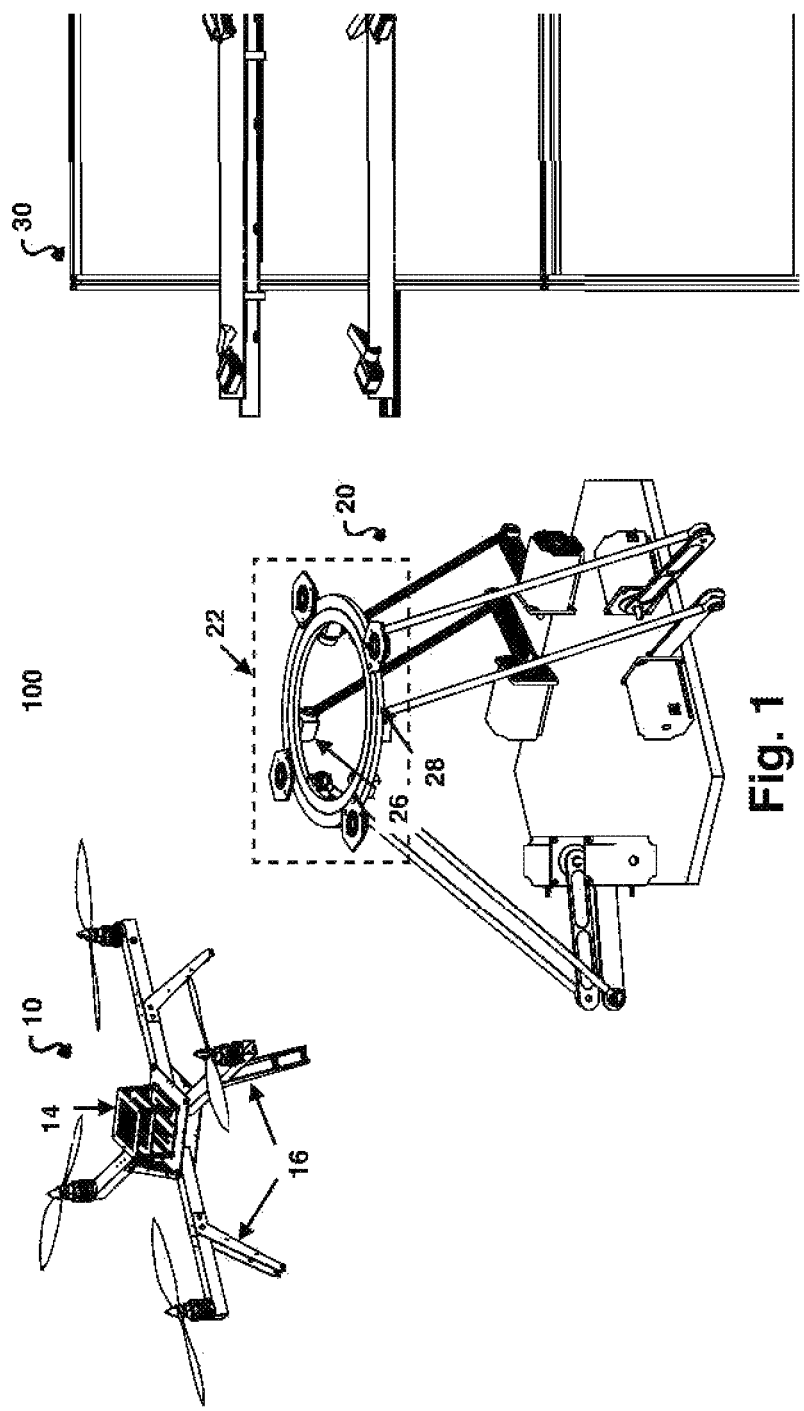
FIG. 1 is a schematic illustration of the primary components of the launch and capture system according to aspects of the disclosure.

A system 100 for facilitating automatic takeoff and landing of small UAVs is shown in FIG. 1. At least one UAV 10 may be configured to takeoff from and land on LCM 20. The UAV 10 may include a communication mechanism 14, such as, e.g., a transceiver (not shown), that transmits and/or receives data to/from LCM 20 via a communication link. The communication mechanism 14 may be configured, for example, to radio position and flight path information to LCM 20. The communication mechanism 14 may also be configured to receive mission flight instructions, for example, wirelessly. The mission and flight coordinates can be updated in real time wirelessly while the UAV is in flight. According to some aspects of the disclosure, where multiple UAVs are in flight, one or more of the UAVs may act as repeaters to transmit wirelessly received mission and flight data, thereby extending the communication range of the system. UAV 10 may comprise legs 16 configured to mate with a locking mechanism 22, of LCM 20 for landing.

LCM 20 may comprise a locking mechanism 22 for mating with UAV 10. For example, the locking mechanism 22 may comprise engaging components for engaging the legs 16 of the UAV 10. For example, as shown in FIG. 1, the locking mechanism may comprise four engaging components that would mate respectively with four legs of the UAV. According to some aspects of the disclosure, the legs 16 may include, e.g., ferrous material (or magnets) that may connect magnetically with, e.g., electromagnets for magnetic materials) on the locking mechanism 22. In other aspects, the connection may be mechanical in nature. Any other types of positive locking mechanisms may also be used.

LCM 20 may include a robotic mechanism settable with six axes: roll, pitch, yaw, x, y, and z, allowing the LCM to align with and intercept UAV 10 while in flight. LCM 20 may comprise a plurality of arms 24. For example, as shown in FIG. 1, six arms may be provided. Each arm may be comprised of one or more pieces to enable the arms to stretch and rotate in order to match the position of an incoming UAV 10. At the base of each arm, an electric motor may be provided for adjusting the position of the corresponding arm when launching or capturing an incoming UAV. An electric motor 26 may be provided to rotate an inner ring 28 of the LCM 20 in order to align the UAV with storage system 30. The electric motor 26 may also be configured to rotate the inner ring 28 of the LCM 20 in order to align the locking mechanism 22 with the legs of the UAV. A controller not shown) may be located within or communicatively coupled to LCM 20, and may comprise software and/or hardware to facilitate commands to capture or launch UAV. The controller may be configured to calculate and monitor the location of UAV 10 as it approaches LCM 20. The controller may include one or more transducers (e.g., a sensor, an optical sensor, an RF sensor, an IR sensor, a CCD, a camera, or the like) to determine a relative position of a UAV 10 as it approaches the LCM 20. The LCM 20 may include an inertia measurement unit (IMU) mounted to its base to measure abrupt movements of the LCM 20. The LCM 20 may include a gyroscope. For example, as described herein, LCM 20 may be mounted to a moving vehicle. If the moving vehicles traverses rough terrain, this many result in abrupt movements of the LCM 20. Such abrupt movements may be considered when attempting to align the LCM 20 to an approaching UAV 10.

Storage system 30 may be configured to receive and store UAVs. The storage system 30 may include means for accepting a UAV from LCM. 20 and storing the UAV in a storage receptacle (not shown). Storage system 30 will be described in further detail herein.

In the example shown in FIG. 1, the LCM 20 includes four electromagnets, a ring bearing and a motor to rotate the inner ring of the bearing for yaw control at the top. At the base of each arm, the LCM 20 includes electric motors, lower and upper arm segments that connect up to the landing plate, a positive locking mechanism to capture the UAV 10, a ring bearing for yaw control, a communications mechanism, a control box, and an electric motor for ring bearing yaw.

FIG. 2 further illustrates the connection between UAV 10 and LCM 20. This example illustrates an arm absorbing the inertial energy of a UAV landing. As seen in FIG. 2, the arms of LCM 20 may be rotated to match the position of UAV 10 as it lands. The arms may be configured to absorb the inertial energy of the landing. This allows the UAV to fly in at higher speeds with lower control and precision requirements.

FIG. 3 illustrates the interception function of LCM 20. UAV 10 may fly into a workspace associated with the LCM with higher than normal landing speeds. LCM 20 may be configured to track the UAV 10 and to compute a predicted trajectory path 52 and interception point 54. The interception point may be calculated to define a position and velocity with direction, allowing the relative speeds of the UAV and landing plate to become close to zero. LCM 20 may compute a deceleration area and the landing plate may be configured to slow down in the deceleration region. The arms may then be configured to move to a handoff position and move the UAV into the storage system.

Figure 4A:
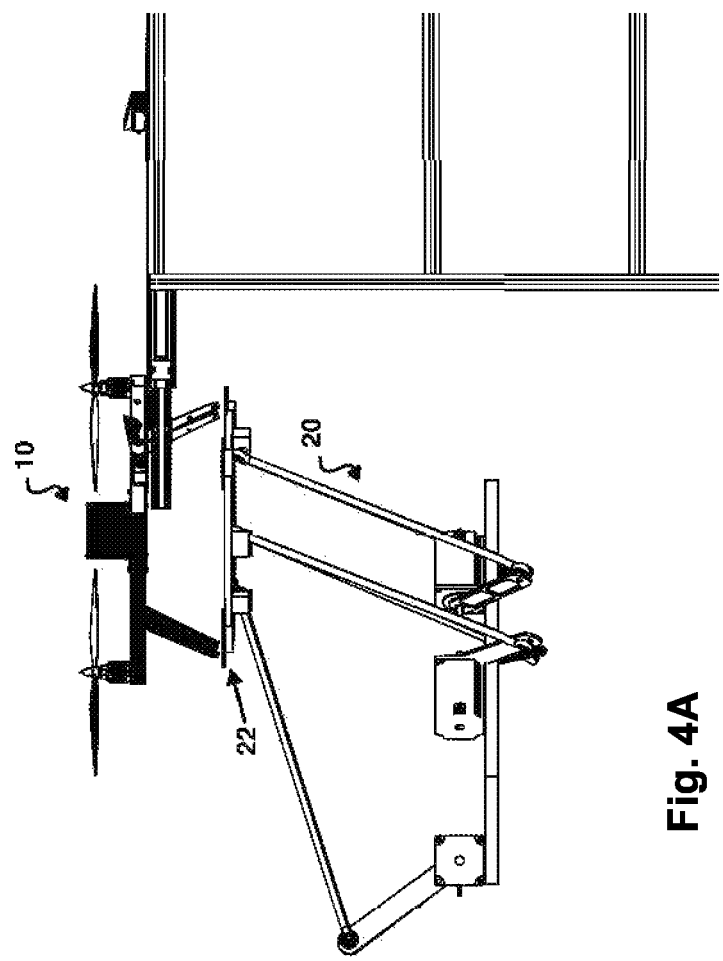

FIGS. 4A-4C illustrate an example of a handoff from the LCM to the storage system. The storage system may include, for example, telescoping rails that extend toward the LCM to engage a mechanical positive lock and hold the UAV. For example, the mechanical positive lock may comprise a servos controlled latch or any other type of mechanical lock. According to some aspects of the disclosure, a non-mechanical lock may be used, such as, for example, a magnetic or electromagnetic lock or any other type of locking mechanism. For a brief period, the UAV may be locked to both the LCM and the telescoping rails of the storage system. The LCM may then release its locking mechanism and control of the UAV may be handed off to the storage system.

Figure 5:
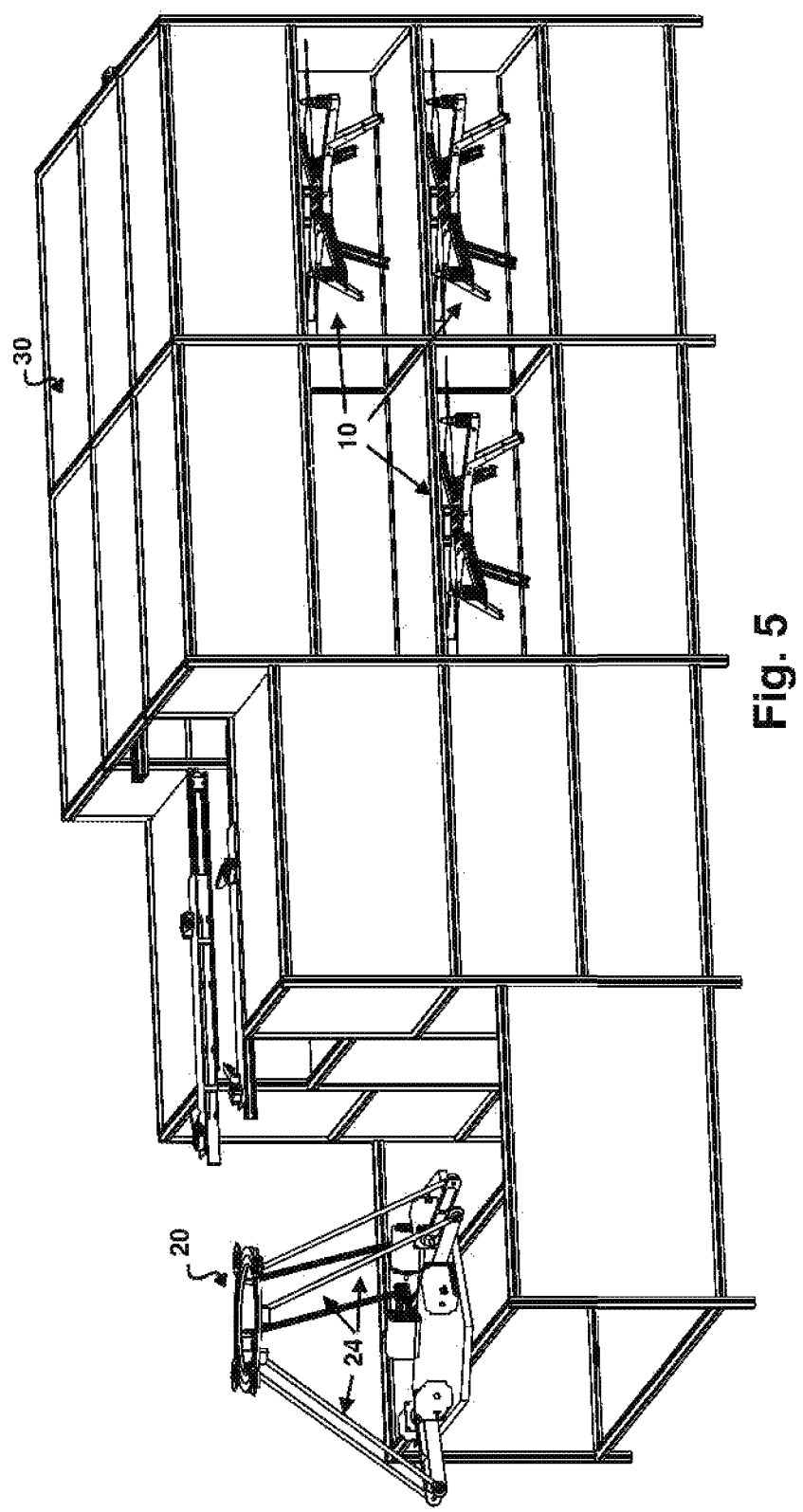
FIG. 5 is an illustration of a storage system.

FIG. 5 illustrates an example of the LCM and storage system together. A UAV lands and becomes locked to the LCM. The LCM then aligns the UAV and moves to a suitable location for handoff. The storage system may extend its telescoping rails to positively lock the UAV in place. The UAV may then be unlocked from the LCM, the telescoping rails retracted, and the UAV passed into an opening in the storage system. As shown in the cutaway, the UAV may be docked in one of a plurality of receptacles. Each receptacle may include, for example, a power link and/or data link to service the UAV.

For example, a data link inside of the storage receptacle may be used to download mission instructions and/or other flight data to (or from) a UAV while in storage. As described above, the UAV may also receive such information wirelessly, either while in flight or stored. Data may include, for example, images, sensor data (such as, e.g., air temperature, wind speeds, radiation levels, moisture content, air density, contaminants, or the like), video, audio, and/or any other relevant data. Power may be provided, for example, via a connector in the receptacle that physically mates with a port on the UAV (e.g., male/female connectors), via an electric field (e.g., inductive charging, such as, e.g., a pair of coils, wherein a coil provided in the storage induces a current in a coil provided ire the UAV, or the like) in the storage receptacle that couples to an electronic component of the UAV, and/or any other power charging mechanism.

Figure 6:
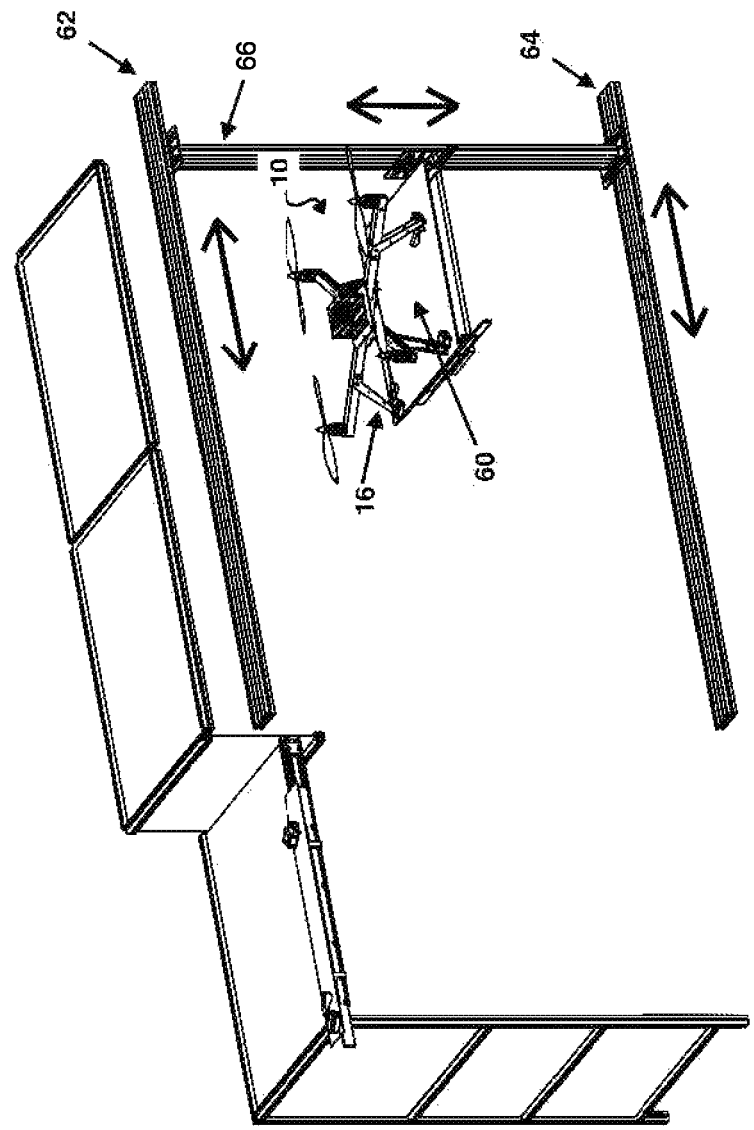
FIG. 6 shows an example of a cutaway view of the storage system.

FIG. 6 provides an internal view of the storage system. As shown in FIG. 6, once a UAV is handed off from the LCM, it may be placed on a transport plate 60 that is configured to move the UAV into the appropriate receptacle. Transport plate 60 may be disposed between two horizontal rails 62, 64, that move the transport plate in the horizontal direction, and a vertical rail 66 from moving the transport plate vertically. The transport plate 60 may also be configured to move into a storage receptacle to place a. UAV within the receptacle. The transport plate 60 may include means for aligning the UAV rotors, and keeping the rotors aligned and secured as the UAV moves through the storage system.

Figure 7:
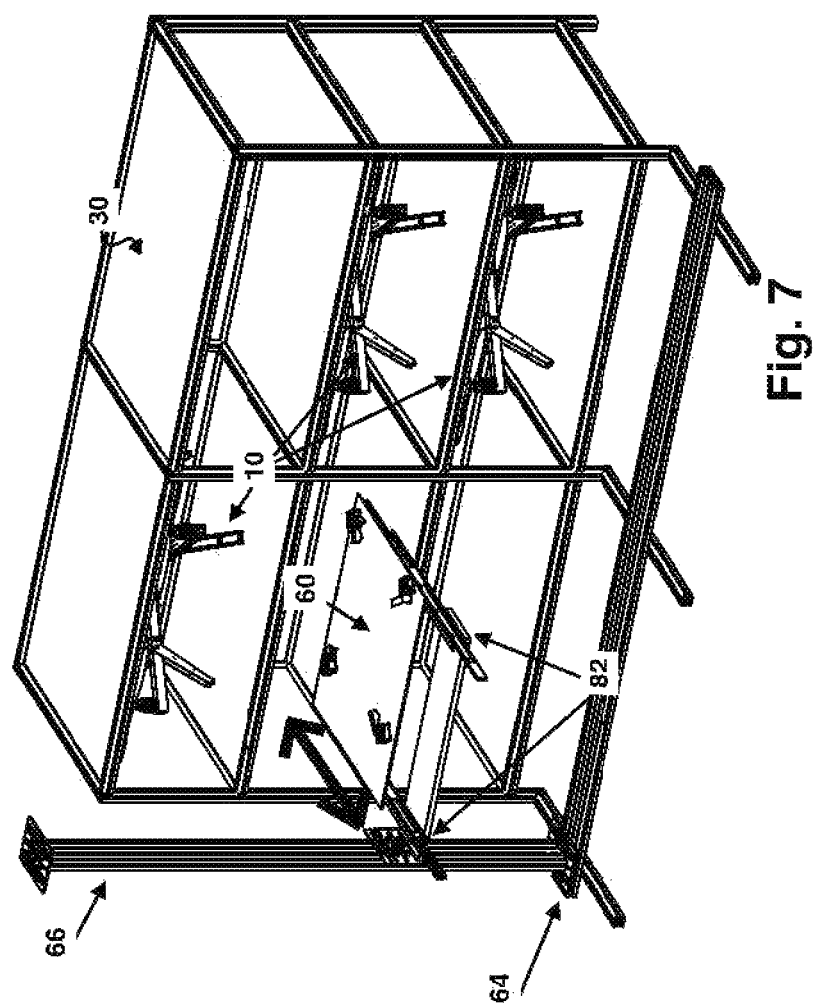
FIG. 7 shows an example of another cutaway view that shows the storage receptacles for housing UAVs.

FIG. 7 illustrates a plurality of receptacles for storing UAVs. The arrows shown in FIG. 7, illustrate the ability of the transport plate to move in and out of a receptacle.

Figure 8:
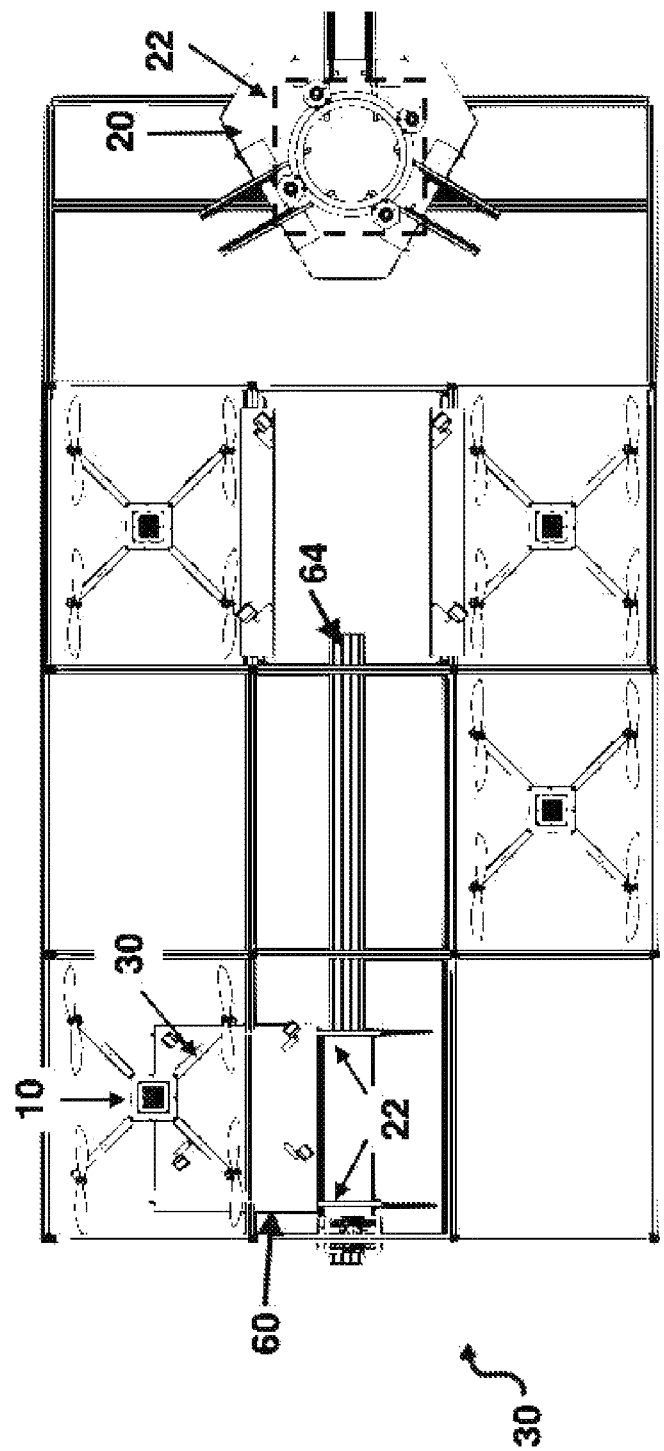
FIG. 8 shows an example of a top down cutaway view of an inside of the storage system.

FIG. 8 is a top-down cutaway view of the inside of the storage system. As shown in FIG. 8, UAVs may be stored on both sides of the transport mechanism. The transport plate 60 may be mounted to telescoping rails 82 that allow the plate to extend into a receptacle. The UAV may be positively locked to the receptacle before the transport plate 60 is released.

Storage system 30 may be configured to act as a UAV dispensing machine that stores and dispatches UAVs on demand. Battery levels may be monitored and data may be interfaced to and from the UAVs within the storage system. A user may request a particular vehicle based on battery levels, vehicle identifier, or payload. According to some aspects of the disclosure, UAVs with varying payloads can be stored and requested based on the type of mission. While stored in storage system 30, UAVs may have batteries charged and payloads reloaded. The storage system 30 may include a payload manipulation component (not shown) configured to add a payload, remove a payload, modify a currently mounted payload on a UAV, and/or other payload manipulations. For example, the payload manipulation component may be configured to load or em payloads such as mail, supplies, scientific samples (e.g., soil, ice samples, etc.), and/or any other payloads. The payload manipulation component may also be configured to add or remove battery cells.

The LCM of the present disclosure may be used for vertical takeoff and land aircraft, particularly small UAVs in the range of, e.g., 2-30 pounds. The LCM may include a robotic system that actively manages the takeoff and landing process by mechanically binding with inflight vehicles and releasing ready-for-flight vehicles.

Figure 9H:
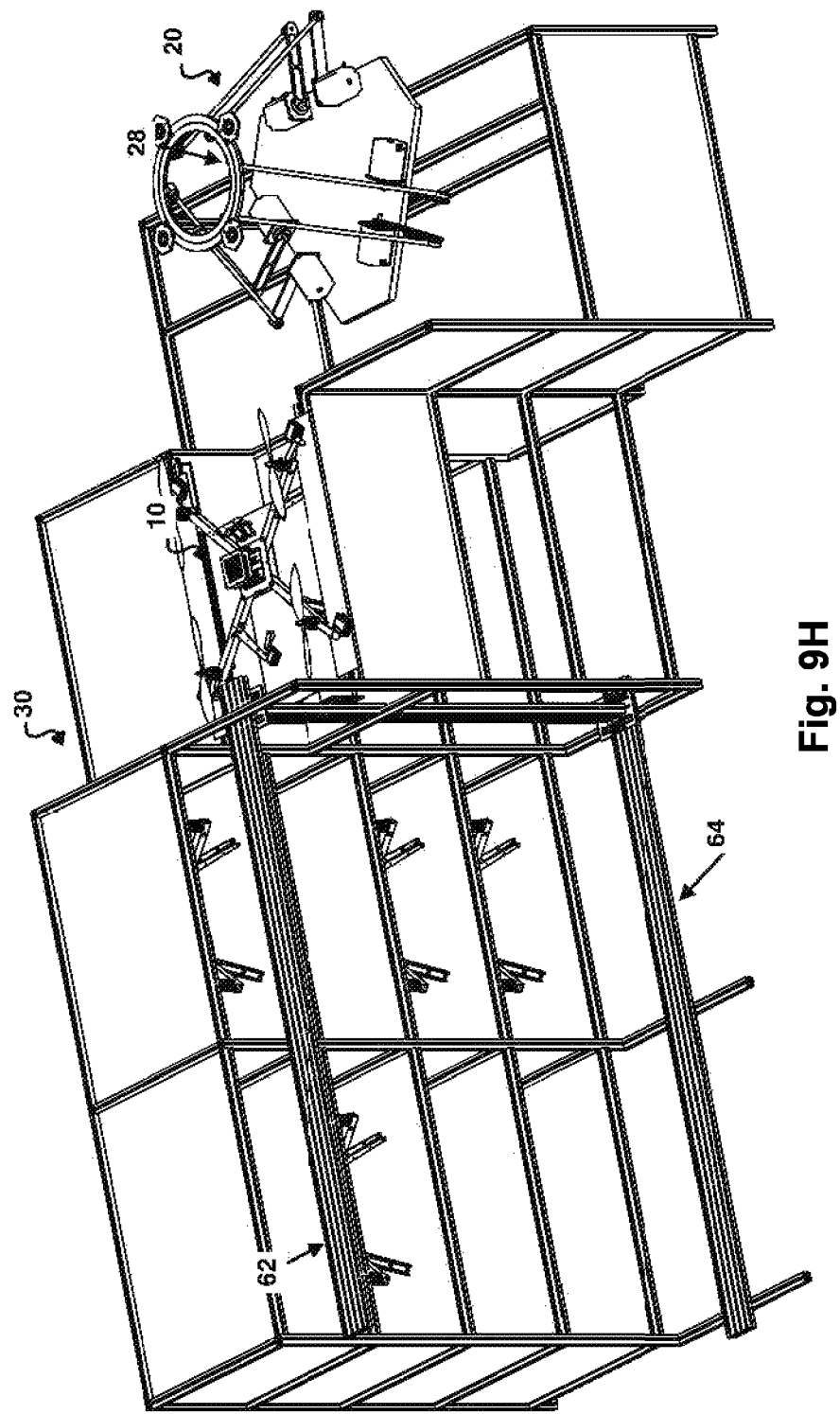
FIGS. 9A-9N show examples of a UAV being captured and then stored.

FIGS. 9A-M illustrate an example of capturing and storing a UAV. As shown in FIG. 9A, a UAV has entered the workspace of the LCM. The LCM is configured to track the position of the UAV as it approaches in order to predict a travel path of the UAV. The LCM may calculate an intercept point for intercepting and capturing the UAV based on the travel path and velocity of the UAV. The LCM can align its cooperative locking mechanism with the legs of the UAV as it approaches the LCM. As seen in FIG. 9A, the legs of the LCM are able to move as needed, under control of the respective motors, to align the LCM with the approaching UAV.

As shown in FIG. 9B, the UAV, upon being captured by the LCM, is locked in place. The capture and locking may occur at the calculated interception point. The LCM may be configured to match the velocity, which includes speed and direction of travel, of the UAV. Once the LCM positively locks to the UAV, it may begin to decelerate the UAV with respect to its inertial limits. The LCM may also signal the UAV to power down its propellers. The LCM may be configured to absorb the inertia of the UAV, bringing it to a stop.

To prepare the UAV for storage in the storage system, the LCM may adjust its legs, as shown in FIG. 9C. In addition, the LCM may rotate the locking mechanism (ring), such that the UAV is properly oriented for storage in a storage receptacle. This may include, for example, orienting the UAV such that its power and/or data ports will be aligned with the receptacle that the UAV is to be placed in.

FIG. 9D shows an example of the storage system telescoping rails extending into a handoff position to retrieve the UAV. According to some aspects of the disclosure, the LCM may be configured to signal to the storage system that a UAV has been captured and needs to be stored, triggering the storage system to extend the telescoping rails. Other methods for triggering the storage system to extend its telescoping rails may be used, such as, for example, operated initiated instructions. As described herein, the UAV may be momentarily locked to both the storage system rails and to the LCM. FIG. 9E is a side view illustrating the UAV locked to both the telescoping rails and to the LCM.

As shown in FIG. 9F, after the LCM releases its locking mechanism, the storage system telescoping rails may be configured to retract, drawing the UAV further into the storage system. The LCM may then return to its home position to await the arrival of another UAV for launch or capture.

As shown in FIGS. 9G and 9H, once the storage system telescoping rails have been retracted, the UAV may then lock to a transport plate. The locking mechanism may between the UAV and the transport plate may be a mechanical locking mechanism, a magnetic locking mechanism, and/or any other locking mechanism. The transport plate is configured to move the UAV from the telescoping rails to a storage receptacle. The transport plate may be configured to move in a vertical direction parallel to the storage receptacle columns, in a horizontal direction parallel to the receptacle rows, and to extend into individual receptacles. In accordance with some aspects of the disclosure, the transport plate may also be configured to move in other directions, such as diagonally. Upon locking to the transport plate, the UAV may initially and momentarily remain locked to the telescoping rails.

Figure 9I:
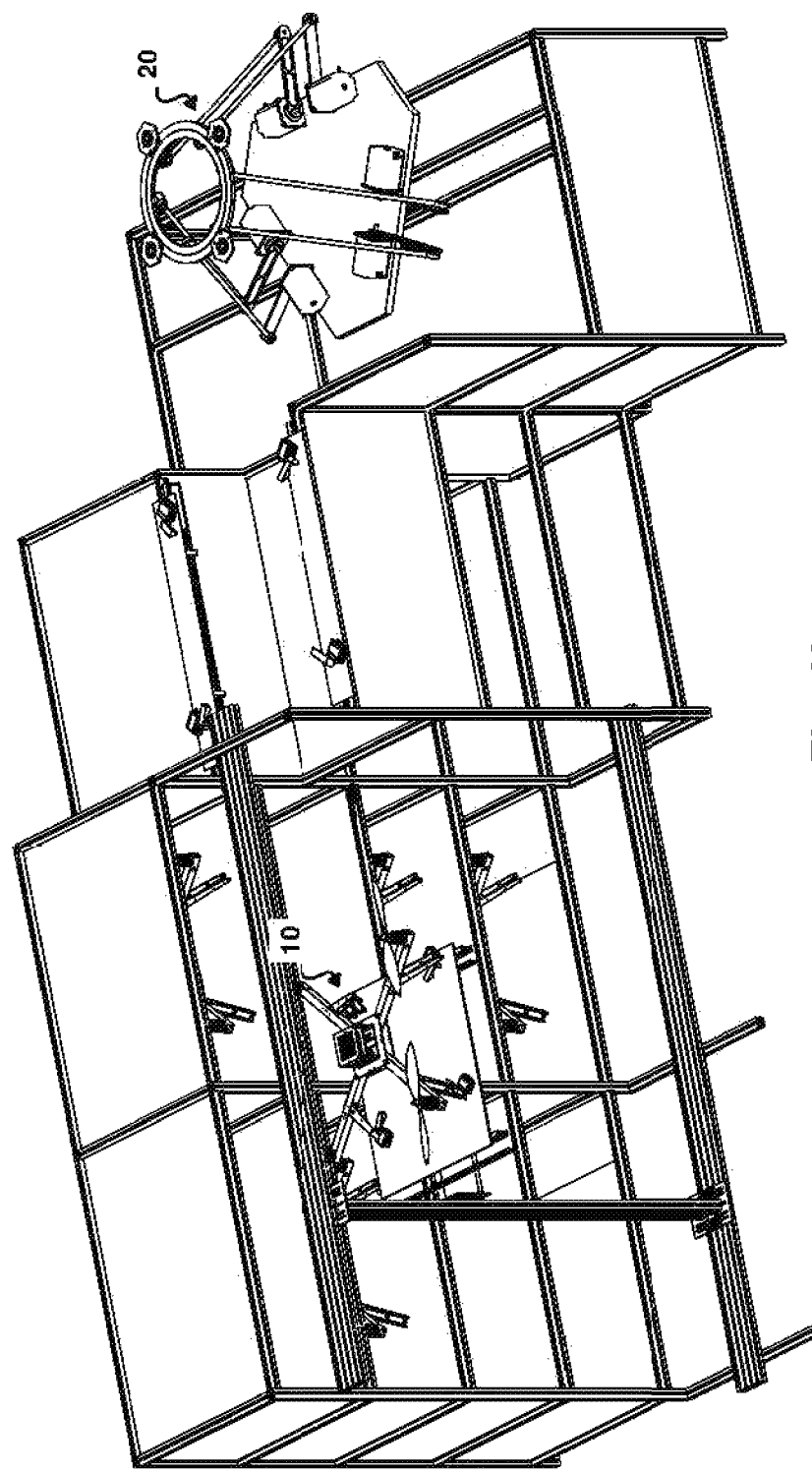

As shown in FIG. 9I, the transport plate moves the UAV horizontally and/or vertically until it arrives at the appropriate receptacle for the UAV. According to some aspects of the disclosure, each UAV may be assigned a specific receptacle. Alternatively, an incoming UAV may be stored in any open receptacle, or may be assigned to a receptacle and the time of its capture. The transport plate may be connected to two horizontal beams and to a vertical beam, as shown in FIG. 9I, allowing to plate to move into various positions.

Figure 9J:
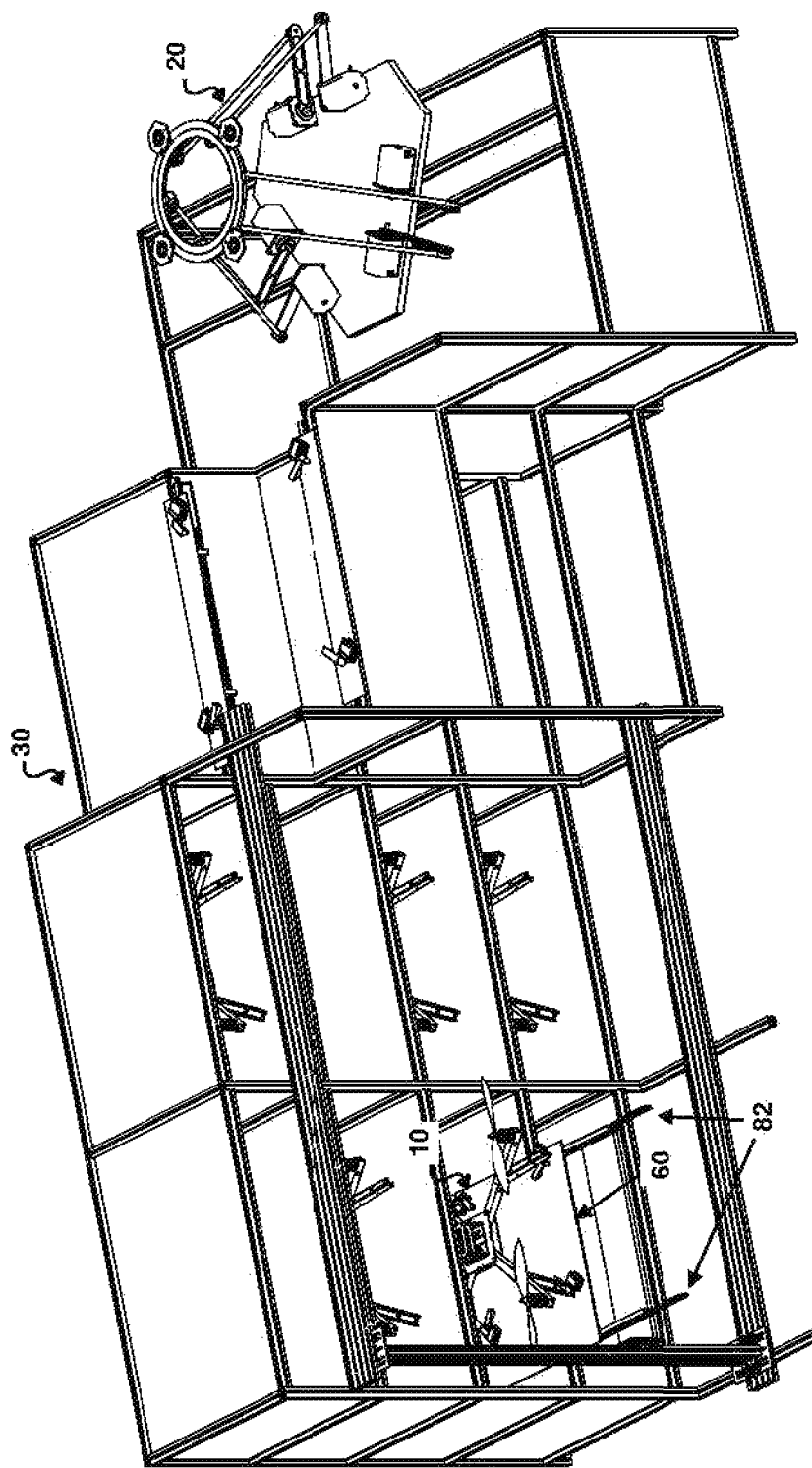
Figure 9K:
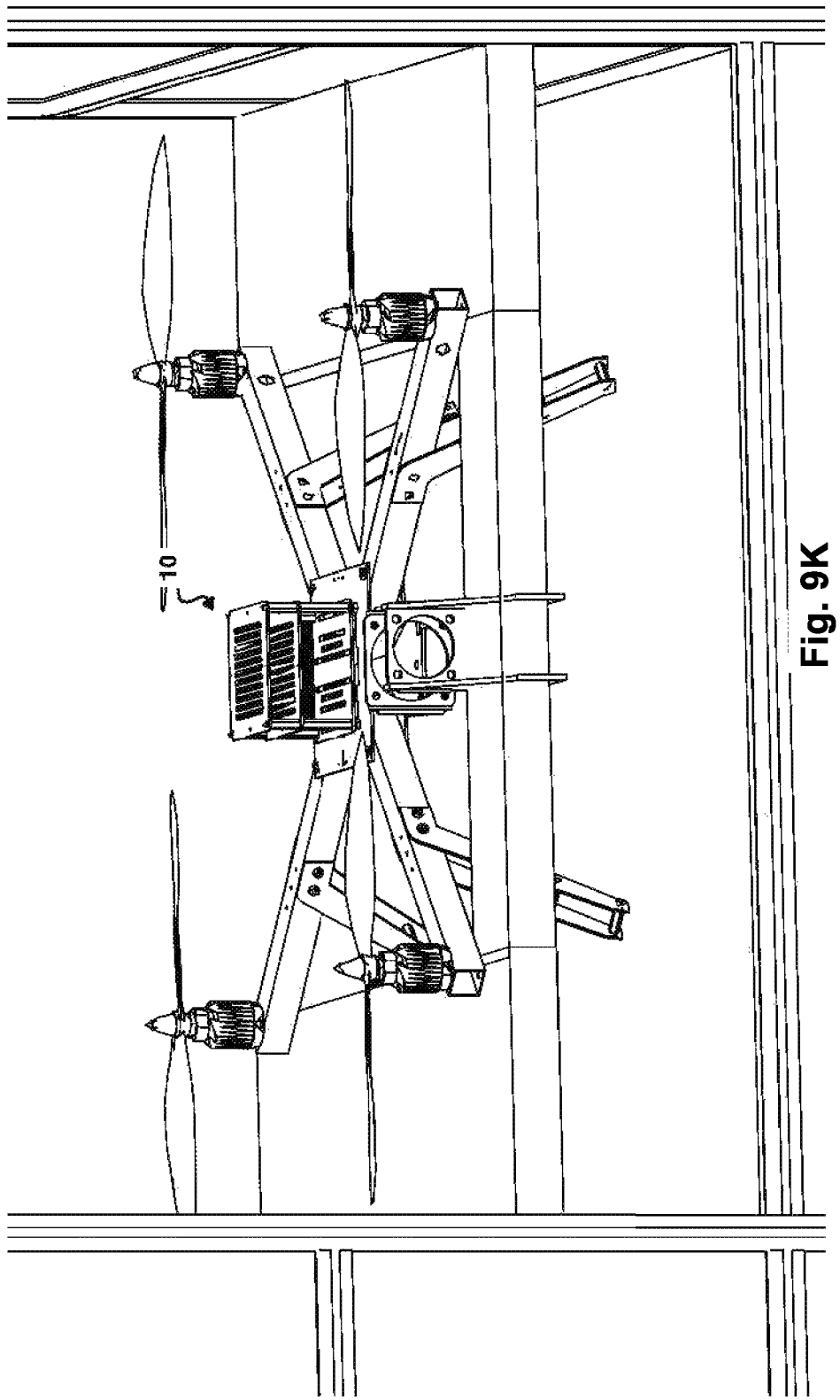
Figure 9L:
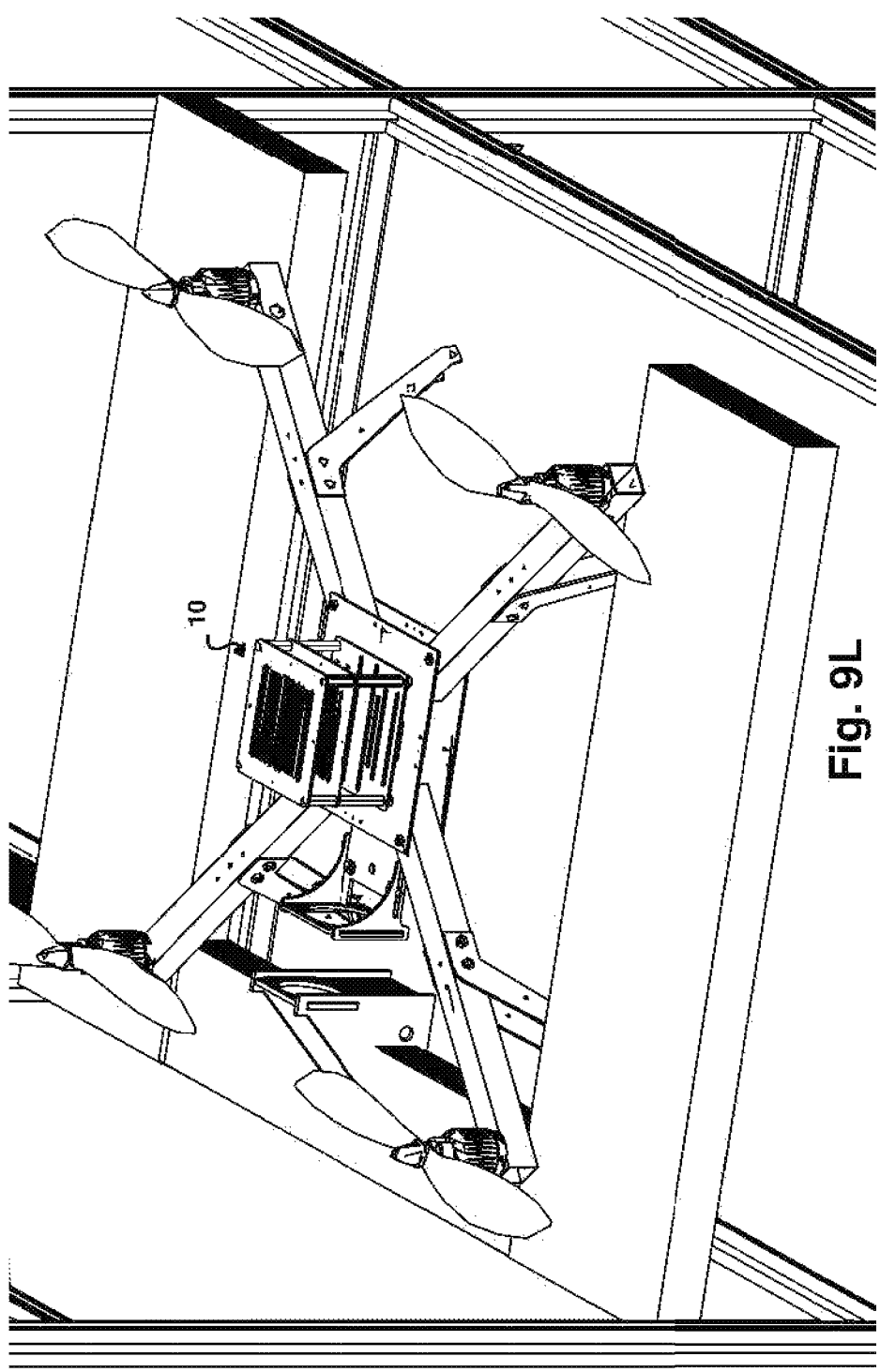

As shown in FIG. 9J, the transport plate aligns the storage receptacle in the horizontal and vertical directions before extending into the storage receptacle to release the UAV. The transport plate may be configured to push the UAV into a position where the UAV is communicatively coupled to power and/or data sources. For example, one or more connectors may be located in each storage receptacle to provide a power and/or data connection to the UAV. FIGS. 9K and 9L show examples of a UAV being inserted into a data and/or power connector.

As shown in FIGS. 9M-9N, the transport plate may withdraw from the receptacle having placed a UAV in the receptacle. The UAV may be locked into the receptacle via, for example, a mechanical, magnetic, and/or any other type of lock. Once locked into the receptacle, the data and/or power links may be activated.

An automated landing and launch system, such as the LCM described herein, would create significant capabilities for small autonomous aircraft. Persistent missions will extend operator on-task times by orders of magnitude, multiplying the effectiveness of UAVs currently in use. Launch and capture from a moving platform will enable a range of applications that were previously not achievable. Additionally, swarming capabilities with large numbers of in-flight UAVs will provide a force multiplication effect where relatively few operators can perform abstracted tasks such as large area search and rescue.

Persistent mission capability is a method of using multiple vehicles that are rotated out so that the operator can stay on task. Using the LCM and the storage system described herein, a relief UAV may be retrieved and launched when the task UAV reaches a low battery level. The relief UAV may autonomously fly to the location of the task UAV and, after notifying the operator via, e.g., video feed and control may instantaneously swap from the task UAV to the relief UAV. The depleted UAV may return home to recharge for a future relief. The operator may stay on task during the entire process and is free to perform lengthy operations. Initial applications may include inspection tasks on power lines and wind turbines as well as persistent eye-in-the-sky tasks for police and news stations.

The present disclosure enables swarming capabilities and a force multiplication effect. With the LCM, the time to launch a UAV may be reduced substantially and the preparation time may be, e.g., zero. Significant numbers of drones can reach the sky simultaneously only limited by the duty cycle of the LCM. Current estimates (e.g., 15 min flight; 10 s land/launch; 1 arm) would put 45 drones in the air; a number that is positively coupled with battery technology and would increase over time. Large numbers of UAVs in the air simultaneously will create new applications that haven't been explored yet. Fire monitoring, situational awareness, and search and rescue missions would benefit with more sensors in the air.

The system may enable swarming persistent missions from moving vehicles in civilian and military applications. Applications may include, e.g., search and rescue while driving through a backcountry; multiple camera angles per sailboat in a race; Situational awareness tools for a moving convoy; wildfire monitoring equipment from a valuable vantage point.

The UAV 10 and/or LCM 20 may include a computer, which may include any machine, device, circuit, component, or module, or any system of machines, devices, circuits, components, modules, or the like, which are capable of manipulating data according to one or more instructions, such as, for example, without limitation, a processor, a microprocessor, a central processing unit, or the like.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, Wifi, WiMAX, IEEE 802.11, DECT, 0G, 1G, 2G, 3G or 4G cellular standards, Bluetooth, and the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The computer(s) may include a computer-readable medium, such as any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The computer-readable medium may include a computer program, including instructions and/or code segments to carry out the processes described herein.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

I claim:

1. A system to automatically land and launch an unmanned air vehicle (UAV), the system comprising:
a launch and capture mechanism (LCM) to launch and land a UAV, the LCM being movable among a plurality of axes to match a detected position and angle of the UAV; and
a storage mechanism to store and retrieve a UAV, the storage mechanism having a plurality of receptacles to store the UAV,
wherein the LCM and the storage mechanism are communicatively coupled to trigger handoff of the UAV between the LCM and the storage mechanism.

2. The system of claim 1, wherein the LCM comprises a locking mechanism to mate with the UAV, the locking mechanism including engaging components to engage a leg of the UAV or a portion of a body of the UAV.

3. The system of claim 2, wherein the controller is further configured to provide flight instructions to the UAV on scheduling when and where it can land and takeoff.

4. The system of claim 2, wherein the storage mechanism further comprises:
a transport plate configured to move the UAV, upon handoff from the LCM, into one of the plurality of receptacles.

5. The system of claim 4, wherein the transport plate is disposed between horizontal rails that move the transport plate in a horizontal direction and a vertical rail that moves the transport plate in a vertical direction.

6. The system of claim 1, wherein the LCM launches and lands the UAV according to priority of a battery charge level, a maintenance level, a mounted payload, or a vehicle identifier.

7. The system of claim 1, wherein the LCM comprises:
a robotic mechanism, the robotic mechanism being settable with a plurality of axes to align with and intercept the UAV while the UAV is in flight.

8. The system of claim 1, wherein the LCM comprises a plurality of arms, the base of each arm comprising an electric motor to adjust the position of the corresponding arm when launching or capturing the UAV.

9. The system according to claim 1, wherein the system interfaces with a planning controller that issues commands to launch and land UAVs according to a schedule.

10. The system of claim 1, further comprising:
an electric motor; and
an inner ring,
wherein the electric motor is configured to rotate the inner ring to align the UAV with the storage mechanism.

11. The system of claim 1, further comprising:
a controller configured to calculate and monitor the location of the UAV as it approaches the LCM.

12. The system of claim 11, wherein the controller comprises:
one or more transducers, the one or more transducers detecting a relative position of the UAV as it approaches the LCM.

13. The system of claim 11, wherein the controller comprises:
one or more absolute positioning systems such that the relative position between the LCM and UAV can be computed by subtracting the absolute position of the LCM and the absolute position of the UAV.

14. The system of claim 13, wherein the controller is configured to communicate navigation data, including relative distance and angle between LCM and UAV or LCM location data to the UAV.

15. The system of claim 1, wherein the LCM comprises a global navigation unit with GPS mounted to the LCM measuring the position as it moves around earth.

16. The system of claim 1, wherein the LCM further comprises an inertia measurement unit mounted to the base of the LCM, the inertia measurement unit measuring abrupt movements of the LCM, and wherein a landing plate is moved in accordance with inertia measurement data from the inertia measurement unit.

17. The system of claim 1, wherein the storage mechanism further comprises:
one or more telescoping rails that extend toward the LCM, the telescoping rails configured to lock and hold the UAV.

18. The system of claim 1, wherein the LCM moves a landed UAV to a handoff position suitable for mating with another robotic system so that the UAV can be removed from the LCM.

19. The system of claim 1, wherein at least one of the plurality of receptacles comprises a data link to download mission instructions or flight data to the UAV while stored, or to download video and sensor data post flight.

20. The system of claim 1, wherein at least one of the plurality of receptacles comprises a power source that couples to the UAV when stored.

21. The system of claim 1, wherein at least one of the plurality of receptacles discharges or charges a UAV battery to manage longevity or lifecycle of the battery.

22. The system of claim 1, wherein at least one of the plurality of receptacles comprises a payload reloading mechanism to reset a spent UAV payload for a next mission.

23. The system of claim 1, wherein the LCM moves to match a detected velocity of the UAV.

24. The system of claim 23, wherein the LCM moves to decelerate the UAV after the UAV lands on the LCM.

25. A method of capturing an unmanned air vehicle (UAV) that is in flight, the method comprising:
    tracking a position and angle of the UAV as it approaches a launch and capture mechanism (LCM) to determine a travel path of the UAV;
    calculating an intercept point for intercepting the UAV based on the travel path and velocity of the UAV;
    aligning the LCM to match the tracked position and angle of the UAV;
    aligning a locking mechanism of the LCM with a leg of the UAV or a portion of a body of the UAV as it approaches the LCM; and
    capturing the UAV at the calculated intercept point.

26. The method of claim 25, further comprising:
    matching, by the LCM, the velocity of the UAV;
    upon aligning the locking mechanism of the LCM with each leg of the UAV, engaging the locking mechanism;
    decelerating the UAV.

27. The method of claim 26, further comprising:
    signaling, by the LCM, a storage mechanism to indicate that a UAV has been captured and is ready for storage, the signaling causing the storage mechanism to extend telescoping rails to accept the UAV from the LCM.

28. The method of claim 27, wherein the storage mechanism is configured to move the UAV into an opening of the storage mechanism and to store the UAV into one of a plurality of storage receptacles in the storage mechanism.

29. The method of claim 27, further comprising:
    rotating the locking mechanism to align the UAV for storage in the storage mechanism.

* * * * *